(12) United States Patent
Gomez Leiva et al.

(10) Patent No.: US 11,713,264 B2
(45) Date of Patent: Aug. 1, 2023

(54) METHOD FOR THE TREATMENT OF WASTEWATERS

(71) Applicant: ARCELORMITTAL, Luxembourg (LU)

(72) Inventors: Patricia Gomez Leiva, Aviles (ES); Vanesa Menendez Delmiro, Aviles (ES); Beatriz Padilla Vivas, Aviles (ES)

(73) Assignee: ArcelorMittal, Luxembourg (LU)

( * ) Notice: Subject to any disclaimer, the term of this patent is extended or adjusted under 35 U.S.C. 154(b) by 24 days.

(21) Appl. No.: 16/757,345

(22) PCT Filed: Dec. 13, 2018

(86) PCT No.: PCT/IB2018/060006
§ 371 (c)(1),
(2) Date: Apr. 17, 2020

(87) PCT Pub. No.: WO2019/116297
PCT Pub. Date: Jun. 20, 2019

(65) Prior Publication Data
US 2021/0188674 A1    Jun. 24, 2021

(30) Foreign Application Priority Data

Dec. 14, 2017    (WO) .................. PCT/IB2017/057927

(51) Int. Cl.
*C02F 1/76*    (2023.01)
*C02F 1/66*    (2023.01)
(Continued)

(52) U.S. Cl.
CPC .................. *C02F 1/76* (2013.01); *C02F 1/66* (2013.01); *C02F 2101/18* (2013.01);
(Continued)

(58) Field of Classification Search
CPC ....................................................... C02F 1/76
See application file for complete search history.

(56) References Cited

U.S. PATENT DOCUMENTS

| 3,970,554 A | 7/1976 | Fischer et al. |
| 4,366,064 A * | 12/1982 | Mihelic ..................... C02F 1/76 |
| | | 210/668 |

(Continued)

FOREIGN PATENT DOCUMENTS

| CN | 1084829 A | 4/1994 |
| CN | 105347575 A | 2/2016 |

(Continued)

OTHER PUBLICATIONS

See International Search Report of PCT/IB2018/060006, dated Feb. 12, 2019.

*Primary Examiner* — Peter Keyworth
(74) *Attorney, Agent, or Firm* — Davidson, Davidson & Kappel, LLC

(57) ABSTRACT

A method for the treatment of wastewaters including a cyanide compound and a metallic compound, wherein the wastewaters are subjected to a single oxidation step during which cyanides compounds are converted into carbon dioxide and nitrogen, this oxidation step including the mixing of wastewaters with a chlorine solution and an alkaline agent so as to obtain a mixture, the alkaline agent being added in such a quantity so as to maintain the pH of said mixture between 8.8 and 9.5 and the chlorine solution being added in such a quantity so as to maintain the oxydo-reduction potential of the mixture between 150 and 450 mV.

21 Claims, 1 Drawing Sheet

(51) Int. Cl.
  *C02F 101/18* (2006.01)
  *C02F 101/20* (2006.01)
  *C02F 103/18* (2006.01)
(52) U.S. Cl.
  CPC ...... *C02F 2101/20* (2013.01); *C02F 2103/18* (2013.01); *C02F 2209/04* (2013.01); *C02F 2209/06* (2013.01)

(56) References Cited

U.S. PATENT DOCUMENTS

| | | |
|---|---|---|
| 4,416,786 A | 11/1983 | Knorre et al. |
| 4,802,995 A * | 2/1989 | Dvorscek ............ A62D 3/35 210/766 |
| 5,051,191 A | 9/1991 | Raasmussen et al. |
| 5,106,508 A | 4/1992 | Schwitzgebel et al. |
| 5,246,598 A | 9/1993 | Proulx et al. |
| 2003/0069462 A1 | 4/2003 | Fisher et al. |
| 2005/0070752 A1 | 3/2005 | Kojima |
| 2015/0315054 A1 | 11/2015 | Tanaka et al. |

FOREIGN PATENT DOCUMENTS

| | | |
|---|---|---|
| GB | 759109 A | 10/1956 |
| JP | 2001-026827 A | 1/2001 |
| JP | 2013-056328 A | 3/2013 |
| JP | 2017-104802 A | 6/2017 |
| RU | 2058943 C1 | 4/1996 |
| RU | 2517502 C1 | 5/2014 |
| RU | 2517507 C2 | 5/2014 |
| RU | 2615023 C2 | 4/2017 |
| WO | WO2014/083903 | 6/2014 |

* cited by examiner

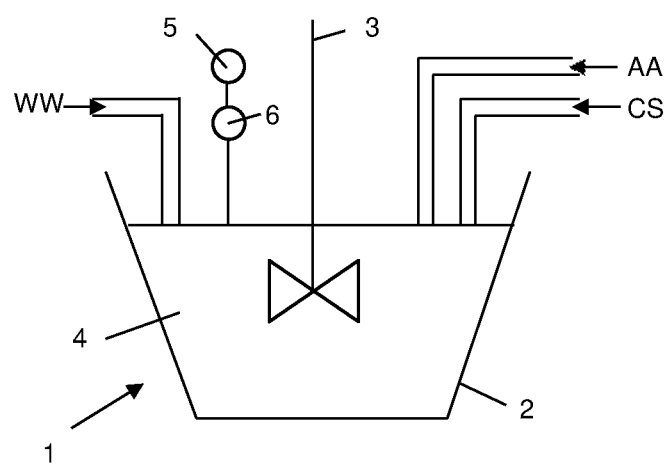

METHOD FOR THE TREATMENT OF WASTEWATERS

The invention is related to a method for the treatment of wastewaters comprising a cyanide compound and a metallic compound.

BACKGROUND

Within a steel plant a lot of gases are emitted which contain dust. These gases need to be cleaned and the cleaning treatments generally use water and so generate wastewaters which need to be discharged. These wastewaters contain the pollutants present in the gas dusts; they may notably contain cyanides, ammonium, fluorides and metals which are detrimental for health and the environment.

Cyanides are very toxic compounds which are detrimental for the environment, they need to be transformed to a non-toxic component before water can be discharged and/or recycled. These cyanides are present under different forms: they may be simple cyanides compounds which consist of a cyanide polyatomic anion and alkali earth metals (NaCN, KCN . . . ) but they may also be Weak Acid Dissociable cyanides (WAD) which are complex metal cyanides (Zn$(CN)^{-2}_4$, $Cd(CN)^{-1}_3$, $Cd(CN)^{-2}_4$ . . . ) which have tendency to break down into free cyanide and a transition metal when they are exposed to a weak acid environment (pH 4,5-6). Free cyanide is the form of cyanide that is bioavailable and known for its toxic effect on organisms. In addition to cyanides, some thiocyanates (SCN) may be present, which are not cyanide species but for which an efficient treatment can be of interest in some cases As a matter of example, targeted discharge limits may be 0.4 mg/l of cyanides, 2 mg/L of zinc, 5 mg/L of iron, 0.5 mg/L of lead and 30 mg/L of ammonia nitrogen.

One known method uses hydrogen peroxide as oxidation agent in order to convert cyanides ($CN^-$) into cyanates ($OCN^-$) (1), which may then be quickly hydrolyzed into carbonate and ammonia (2):

$$CN^- + H_2O_2 \rightarrow OCN^- + H_2O \quad (1)$$

$$OCN^- + H_2O + OH^- \rightarrow CO_3 + NH_3 \quad (2)$$

As disclosed in several documents (U.S. Pat. Nos. 3,970,554, 4,416,786, 5,246,598) this method requires the use of catalysts, such as copper or silver based catalysts, which further need to be removed. Moreover, this method allows removal of WAD cyanides but not of the whole cyanides present in the wastewater.

Another known method is Alkaline Chlorination, as illustrated in document GB 759 109. This method uses hypochlorite and is performed in two steps. Cyanides ($CN^-$) are first oxidized to cyanate ($OCN^-$) and then to carbon dioxide and nitrogen. Hypochlorite ($ClO^-$) is produced by contacting chlorine ($Cl_2$) with sodium hydroxide (NaOH) (equation 3 and 3'). The reaction is reversible, with some free chlorine left in solution. In cyanide transformation, hypochlorite ($ClO^-$) reacts with cyanide ($CN^-$) to form cyanogen chloride (CNCl) (equation 4). The cyanogen chloride (CNCl) reacts with available hydroxide ($OH^-$) to form cyanate ($CNO^-$) (equation 5). Then the cyanate ($CNO^-$) is converted to the more innocuous carbon dioxide and nitrogen (equation 6).

$$2NaOH + Cl_2 \leftrightarrow NaClO + NaCl + H_2O \quad (3)$$

$$NaClO \leftrightarrow Na^+ + ClO^- \quad (3')$$

$$CN^- + H_2O + ClO^- \rightarrow CNCl(g) + 2OH^- \quad (4)$$

$$CNCl(g) + 2OH^- \rightarrow CNO^- + Cl^- + H_2O \quad (5)$$

$$2CNO^- + 3ClO^- + H_2O \rightarrow 2CO_2 + N_2 + 3Cl^- + 2OH^- \quad (6)$$

Cyanogen chloride (CNCl (g)) is a highly toxic compound; it has to be degraded quickly to avoid being released in the atmosphere. The first step, from equation 3 to 5 is performed in a first reactor wherein the pH is kept between 10 and 12 to optimize the conversion of cyanide to cyanate and to convert CNCl immediately to cyanate, preventing its release from solution. This high pH allows oxidation of metallic compounds too. It lasts generally between 40 and 60 min, up to 12 hours when certain metal cyanide complexes are present. The second step is performed in a second reactor wherein the pH is reduced to 7.5-8.5. It should never fall below pH 7 as highly toxic hydrogen cyanide can be generated if the first-stage reaction is not complete. This second step requires a reaction time of between 30 and 60 minutes at pH 7.5-8.5. Lime ($Ca(OH)_2$) is usually used to bring hydroxide ($OH^-$) and keep the pH within the required range.

This method requires the use of several tanks to perform the different steps at different pH. Moreover, this method requires a big consumption of reactive, namely sodium hypochlorite (NaClO) and lime ($Ca(OH)_2$).

SUMMARY OF THE INVENTION

There is indeed a need for an improved treatment method of wastewaters containing cyanide compounds and metallic compounds which is able to transform all kind of cyanides compounds in nontoxic compounds with a better efficiency, notably in terms of reactive consumption and time of treatment. In a preferred embodiment, such method could also treat the thiocyanate compounds to reduce their content.

The present invention provides a method for the treatment of wastewaters comprising a cyanide compound and a metallic compound, wherein said wastewaters are subjected to a single oxidation step during which cyanides compounds are converted into carbon dioxide and nitrogen, this oxidation step comprising the mixing of wastewaters with a chlorine solution and an alkaline agent so as to obtain a mixture, the alkaline agent being added in such a quantity as to maintain the pH of the mixture between 8.8 and 9.5 and the chlorine solution being added in such a quantity so as to maintain the oxydo-reduction potential of the mixture between 150 and 450 mV.

Those specific operational conditions allow the oxidation in a single step and so in single equipment of the several cyanide species and of the metallic compounds present in the wastewater.

The method of the invention may also comprise the following optional characteristics considered separately or according to all possible technical combinations:
  the chlorine solution is a sodium hypochlorite solution,
  the alkaline agent is lime,
  the pH of the mixture is maintained between 8.9 and 9.1,
  the oxydo-reduction potential of the mixture is maintained between 350 and 400 mV,
  the oxydo-reduction potential of the mixture is maintained between 150 and 200 mV,
  the oxydo-reduction potential of the mixture is maintained between 180 and 230 mV,
  the wastewaters initially contain between 1.5 ppm and 15 ppm in weight of cyanides, including between 1 and 10 ppm in weight of weak acid dissociable cyanides, between 0.8 and 3 ppm in weight of zinc, up to 8 ppm in weight of iron, between 0.05 and 0.5 ppm in weight of lead, the wastewaters are derived from blast furnace gas cleaning, after the oxidation step, the mixture is further subjected to a clarification step wherein it is separated between clarified water and sludge, the clean water comprises less than 0.4 mg/l of cyanides, less than 2 mg/L of zinc, less than 5 mg/L of iron, less than 0.5 mg/L of lead and less than 30 mg/L of ammonia nitrogen, the quantity of chlorine solution used for treating 1 m$^3$ of wastewaters is less than or equal to 6 litres, the quantity of alkaline agent used for treating 1 m$^3$ of wastewaters is less than or equal to 10 litres.

BRIEF DESCRIPTION OF THE DRAWINGS

The invention will be better understood upon reading the description which follows, given with reference to the following appended FIGURES:

FIG. 1 illustrates an embodiment of device to perform a treatment method according to the invention

DETAILED DESCRIPTION

In FIG. 1 is illustrated a device 1 to perform a method according to the invention. Wastewaters WW containing a cyanide compound and a metallic compound are sent to a tank 2 equipped with a mixer 3. A chlorine solution CS and at least one alkaline agent AA are also injected into the tank and are mixed together with the wastewaters WW to form a mixture 4.

The chlorine solution CS may be sodium hypochlorite (NaClO) or calcium hypochlorite (CaClO). The chlorine solution is added in such a quantity so as to keep the oxydo-reduction potential (ORP) of the solution between 150 mV and 400 mV. Regular addition of CS may be performed during the treatment so that the ORP remains in the given range. The oxydo-reduction potential of a solution is a measure of the tendency of the solution to either gain or lose electrons when it is subject to change by introduction of a new species. A solution with a higher (more positive) reduction potential than the new species will have a tendency to gain electrons from the new species (i.e. to be reduced by oxidizing the new species) and a solution with a lower (more negative) reduction potential will have a tendency to lose electrons to the new species (i.e. to be oxidized by reducing the new species). Just as the transfer of hydrogen ions between chemical species determines the pH of an aqueous solution, the transfer of electrons between chemical species determines the reduction potential of an aqueous solution. Like pH, the reduction potential represents how strongly electrons are transferred to or from species in solution. In a preferred embodiment, the ORP is comprised between 150 mV and 250 mV and in a most preferred embodiment, between 180 and 200 mV. In another embodiment, the ORP is comprised between 350 and 400 mV. This last specific range of ORP allows elimination of ammonia nitrogen (N—NH$_3$) from the mixture. Ammonia nitrogen (N—NH$_3$) is a compound that, if present in too high quantity may disrupt the equilibrium of ecosystems; depending on its initial quantity within the wastewater their content may so need to be lowered. The ORP may be continuously measured by a 1$^{st}$ sensor 11 which is preferably a gold ORP sensor, which has the specificity to avoid interference with cyanide compounds.

The alkaline agent AA is for example milk of lime (Ca(OH)$_2$), which is a suspension of lime in water, or sodium hydroxide (NaOH). The alkaline agent AA is added in such a quantity so as to keep the pH between 8.5 and 9.5, more preferably the pH is comprised between 8.9 and 9.1. Regular addition of AA may be performed during the treatment so that the ORP remains in the given range. The pH may be continuously measured by a 2$^{nd}$ sensor 12 which may be a standard commercial pH sensor.

The wastewaters WW containing a cyanide compound and a metallic compound may be wastewaters coming from a steelmaking plant, such as wastewaters diverted from the cleaning of blast furnace exhaust gases. Before treatment the wastewaters contain for example between 1.5 ppm and 15 ppm in weight of cyanides, including between 1 and 10 ppm in weight of WAD, between 0.8 and 3 ppm in weight of zinc, up to 8 ppm in weight of iron, between 0.05 and 0.5 ppm in weight of lead.

The method can be performed either by treating a given quantity of wastewaters one after the other or by having a continuous inlet flow of wastewater and a continuous outlet flow of treated wastewaters. In both cases, alkaline agent AA and chlorine solution CS have to be added to the mixture 4 in required quantities to reach the above-mentioned pH and ORP conditions.

After treatment the mixture is subjected to a clarification step in order to remove solid particles. To do so, treated wastewaters can be sent to a decanter where a flocculent, such as TeCol from TRIENXIS Company is added to improve the precipitation of colloidal particles present in the water, such as metallic compounds, and of suspended solid particles. The aim is to recover clean water. Sludge containing the solid particles is a by-product of such a clarification process.

Results

Wastewaters derived from the cleaning of blast furnace gas have been subjected to a treatment method according to prior art (method 1), to a method according to a 1$^{st}$ embodiment of the invention (method 2) and to a 2$^{nd}$ embodiment of the invention (method 3). The wastewaters initially contained between 1.5 ppm and 15 ppm in weight of cyanides, among them between 1 and 10 ppm in weight of WAD, between 0.8 and 3 ppm in weight of zinc, up to 8 ppm in weight of iron, between 0.05 and 0.5 ppm in weight of lead. Results are presented in table 1.

Following contents in the final treated water have been measured:

WAD content, using spectrophotometry (according to norm EN ISO 14403)

Total cyanide content, using spectrophotometry (according to norm EN ISO 14403:2002)

SCN content, using spectrophotometry (standard method 4500-CN-M)

N—NH3 content, using potentiometry (standard method 4500-NH3-D)

Zn, Pb, Fe content using inductively coupled plasma optical emission spectrometry (ICP-OES) (norm EN ISO 11885:2010)

In method 1, wastewaters are mixed in a first oxidation tank with a solution of milk of lime and NaClO, so as to reach a pH around 10.5. The ORP was measured and was between 325 and 400 mV. In this tank, previously mentioned reactions 3 to 5 occur as well as oxidation of metal compounds, for example according to following reaction for zinc:

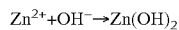

Then hydrochloric acid (HCl) is added to decrease the pH till 7.5 to perform the second oxidation step (previously mentioned reaction 6) within a second oxidation tank wherein NaClO is mixed with the solution. The ORP was measured and was between 600 and 800 mV. The treated water is then sent to a flocculation tank where it is mixed with a flocculent (TeCol from TRIENXIS company) before being sent to a clarification tank where solid particles are separated from sludge.

In method 2, wastewater is sent to a tank where it is mixed with NaClO and milk of lime. pH was maintained at 9 by addition of the appropriate amount of milk of lime and ORP to 150 mV by addition of the appropriate amount of NaClO. Treated water is then sent to a flocculation tank where it is mixed with a flocculent (TeCol from TRIENXIS Company) before being sent to a clarification tank where solid particles are separated from water.

In the method 3, same steps as in method 2 are performed with same pH but the ORP was maintained to 350 mV through adequate addition of NaClO.

TABLE 1

|  | Method 1 | Method 2 | Method 3 |
|---|---|---|---|
| pH | 1st oxidation step: 10.5 | — | — |
|  | 2nd oxidation step: 7.5 | 9 | 9 |
| ORP | 1st oxidation step: 325-400 mV | — | — |
|  | 2nd oxidation step: 600-800 mV | 150 | 350 |
| NaClO | 10 L/m³ | 0.5 L/m³ | 4-6 L/m³ |
| Milk of lime at 10% Ca(OH)₂ | 50 L/m³ | 5 L/m³ | 5 L/m³ |
| % w WAD CN | <0.2 ppm | <0.05 ppm | <0.05 ppm |
| % w total CN | <0.2 ppm | <0.05 ppm | <0.05 ppm |
| % w SCN | <1 ppm | 6 ppm | 0.2-1 ppm |
| % w Zn | <0.07 ppm | <0.05 ppm | 0.06 ppm |
| % w Fe | <0.07 ppm | 0.2 ppm | 0.05 ppm |
| % w Pb | <0.05 ppm | 0.05 ppm | <0.05 ppm |
| % w N—NH₃ | <1 ppm | ? | 8-10 ppm |
| Sludge generated | 0.05 m³ sludge/m³ treated water | <0.002 m³ sludge/m³ treated water | <0.002 m³ sludge/m³ treated water |
| Treatment time | 2 h15: 1 hour of residence time for the first oxidation step + 1 hour of residence time for the second oxidation step + 15 minutes for acidification between both steps | 1 hour of residence time | 1 hour of residence time |

As can be seen from table 1, the method according to the invention allows reduction in consumption of reactive used, in the present case of NaClO and milk of lime while allowing efficient removal of the pollutants. Moreover, the method according to the invention allows reduction of sludge generation, sludge which needs to be either further recycled or landfilled. The embodiment of the invention according to method 3 allows treatment of ammonia nitrogen. The treatment time is also shortened with a treatment method according to the invention.

In a 2nd phase of trials, a continuous water flow around 1.5-5 m³/hour of Blast furnace wastewater was sent to a reaction tank where it was mixed with milk of lime and chlorine. amounts of both reactants were chosen so as to reach ORP and pH as indicated in table 2. Treated water was then sent to a flocculation tank where it was mixed with a flocculent (TeCol from TRIENXIS Company) before being sent to a clarification tank where solid particles are separated from water. Results of those trials are illustrated in table 2. As industrial wastewaters are used, their composition from one trial to another vary which may explain some variations in the obtained results.

TABLE 2

|  | Trials n° | | | | |
|---|---|---|---|---|---|
|  | 1 | 2 | 3 | 4 | 5 |
| pH | 9 | 9 | 9 | 9 | 9 |
| ORP (mV) | 350 | 230 | 200 | 180 | 150 |
| NaClO (L/m³) | 4-6 | 1.1 | 1.2 | 0.7 | 0.5 |
| Milk of lime at 10% Ca(OH)₂ (L/m³) | 5 | 9.9 | 13.2 | 10.5 | 7.3 |
| % w WAD CN (ppm) | <0.05 | 0.08 | <0.05 | 0.09 | 0.8 |
| % w total CN (ppm) | <0.05 | 0.2 | 0.07 | 0.36 | 1.6 |
| % w SCN (ppm) | 0.2-1 | 1.15 | 0.15 | 1.1 | 1.6 |
| % w Zn (ppm) | 0.06 | 0.07 | 0.05 | 0.08 | 0.05 |
| % w Fe (ppm) | 0.05 | 3.1 | 1.7 | 1.9 | 2.6 |
| % w Pb (ppm) | <0.05 | 0.02 | 0.02 | 0.01 | 0.02 |
| Sludge generated/m³ treated water | <2 | 0.09 | 0.31 | 0.11 | 0.05 |

As can be seen from table 2, by using a method according to the invention it is possible to treat wastewaters while limited the reactants consumption as well as the sludge generation.

What is claimed is:

1. A method for the treatment of wastewaters including a cyanide compound and a metallic compound, the method comprising:
subjecting the wastewaters to a single oxidation step during which cyanides compounds are converted into carbon dioxide and nitrogen, the oxidation step including mixing of the wastewaters with a chlorine solution and an alkaline agent so as to obtain a mixture, the alkaline agent being added in such a quantity so as to maintain a pH of the mixture between 8.8 and 9.5 and the chlorine solution being added in such a quantity so as to maintain one value of an oxydo-reduction potential of the mixture while the cyanides compounds are converted into carbon dioxide and nitrogen, the one value being between 150 and 450 mV.

2. The method as recited in claim 1 wherein the chlorine solution is a sodium hypochlorite solution.

3. The method as recited in claim 1 wherein the alkaline agent is lime.

4. The method as recited in claim 1 wherein the pH of the mixture is maintained between 8.9 and 9.1.

5. The method as recited in claim 1 wherein the wastewaters initially contain:
between 1.5 ppm and 15 ppm in weight of cyanides, including between 1 and 10 ppm in weight of weak acid dissociable cyanides,
between 0.8 and 3 ppm in weight of zinc,
up to 8 ppm in weight of iron, and
between 0.05 and 0.5 ppm in weight of lead.

6. The method as recited in claim 1 wherein the wastewaters are derived from blast furnace gas cleaning.

7. The method as recited in claim 1 further comprising, after the oxidation step, subjecting the mixture to a clarification step where the mixture is separated into clarified water and sludge.

8. The method as recited in claim 1 wherein the alkaline agent is sodium hydroxide.

9. The method as recited in claim 1 wherein the pH is continuously measured.

10. The method as recited in claim 1 wherein a continuous inlet flow of the wastewaters and a continuous outlet flow of treated wastewaters are provided.

11. The method as recited in claim 10 wherein the continuous inlet flow is around 1.5-5 $m^3$/hour.

12. The method as recited in claim 1 wherein the wastewaters, after the treatment, comprise <0.002 $m^3$ sludge/$m^3$.

13. The method as recited in claim 1 wherein the wastewaters after treatment comprise less than 0.4 mg/l of cyanides, less than 2 mg/L of zinc, less than 5 mg/L of iron, less than 0.5 mg/L of lead and less than 30 mg/L of ammonia nitrogen.

14. The method as recited in claim 1 wherein 6 liters, or less, of the chlorine solution is used for treating 1 $m^3$ of the wastewaters.

15. The method as recited in claim 1 wherein 10 liters, or less, of alkaline agent is used for treating 1 $m^3$ of the wastewaters.

16. The method as recited in claim 1 wherein one tank is utilized for the single oxidation step.

17. The method of claim 1 wherein the alkaline agent is milk of lime or sodium hydroxide.

18. A method for the treatment of wastewaters including a cyanide compound and a metallic compound, the method comprising:
subjecting the wastewaters to a single oxidation step during which cyanides compounds are converted into carbon dioxide and nitrogen, the oxidation step including mixing of the wastewaters with a chlorine solution and an alkaline agent so as to obtain a mixture, the alkaline agent being added in such a quantity so as to maintain a pH of the mixture between 8.8 and 9.5 and the chlorine solution being added in such a quantity so as to maintain an oxydo-reduction potential of the mixture at one value while the cyanides compounds are converted into carbon dioxide and nitrogen, the one value being between 350 mV and 400 mV.

19. The method of claim 18 wherein the alkaline agent is milk of lime or sodium hydroxide.

20. A method for the treatment of wastewaters including a cyanide compound and a metallic compound, the method comprising:
subjecting the wastewaters to a single oxidation step during which cyanides compounds are converted into carbon dioxide and nitrogen, the oxidation step including mixing of the wastewaters with a chlorine solution and an alkaline agent so as to obtain a mixture, the alkaline agent being added in such a quantity so as to maintain a pH of the mixture between 8.8 and 9.5 and the chlorine solution being added in such a quantity so as to maintain an oxydo-reduction potential of the mixture between 180 mV and 230 mV while the cyanides compounds are converted into carbon dioxide and nitrogen.

21. A method for the treatment of wastewaters including a cyanide compound and a metallic compound, the method comprising:
subjecting the wastewaters to a single oxidation step during which cyanides compounds are converted into carbon dioxide and nitrogen, the oxidation step including mixing of the wastewaters with a chlorine solution and an alkaline agent so as to obtain a mixture, the alkaline agent being added in such a quantity so as to maintain a pH of the mixture between 8.8 and 9.5 and the chlorine solution being added in such a quantity so as to maintain a set value of an oxydo-reduction potential of the mixture while the cyanides compounds are converted into carbon dioxide and nitrogen, the set value being between 180 mV and 200 mV.

* * * * *